(12) United States Patent
Cohade et al.

(10) Patent No.: US 9,801,491 B2
(45) Date of Patent: Oct. 31, 2017

(54) FOOD COOKING BASKET AND CORRESPONDING COOKING SYSTEM

(75) Inventors: Guillaume Cohade, Reims (FR); Richard Rocca, Nice (FR)

(73) Assignee: SEB S.A., Ecully (FR)

( * ) Notice: Subject to any disclaimer, the term of this patent is extended or adjusted under 35 U.S.C. 154(b) by 376 days.

(21) Appl. No.: 13/141,745

(22) PCT Filed: Dec. 14, 2009

(86) PCT No.: PCT/FR2009/052527
§ 371 (c)(1),
(2), (4) Date: Oct. 6, 2011

(87) PCT Pub. No.: WO2010/072943
PCT Pub. Date: Jul. 1, 2010

(65) Prior Publication Data
US 2012/0017772 A1    Jan. 26, 2012

(30) Foreign Application Priority Data
Dec. 23, 2008 (FR) ..................................... 08 59044

(51) Int. Cl.
| | |
|---|---|
| *A47J 27/16* | (2006.01) |
| *A47J 27/60* | (2006.01) |
| *A47J 27/082* | (2006.01) |
| *A47J 36/20* | (2006.01) |

(52) U.S. Cl.
CPC .............. *A47J 27/60* (2013.01); *A47J 27/082* (2013.01); *A47J 36/20* (2013.01)

(58) Field of Classification Search
CPC .................................. A47J 29/02; A47J 27/16
USPC ......... 99/410, 413, 415, 446, 450, 482, 336, 99/403, 426; 219/401; 126/369; 220/201, 495.03, 560.01, 573.1, 485
See application file for complete search history.

(56) References Cited

U.S. PATENT DOCUMENTS

| | | | | | |
|---|---|---|---|---|---|
| 2,088,614 | A | * | 8/1937 | Schey ......................... | 239/533.6 |
| 2,650,485 | A | * | 9/1953 | La Greca ................... | 220/23.83 |
| 3,070,275 | A | * | 12/1962 | Bostrom ........................ | 229/4.5 |
| 3,078,783 | A | * | 2/1963 | Lee, Sr. .......................... | 99/352 |
| 3,641,926 | A | * | 2/1972 | Williams et al. .............. | 99/448 |
| 3,836,042 | A | * | 9/1974 | Petitto ............................ | 206/519 |
| 4,714,012 | A | * | 12/1987 | Hernandez ..................... | 99/444 |

(Continued)

FOREIGN PATENT DOCUMENTS

| | | |
|---|---|---|
| FR | 2324266 A | 4/1977 |
| WO | 2006/111838 A2 | 10/2006 |
| WO | WO 2006/111838 A2 * | 10/2006 |

*Primary Examiner* — Michael LaFlame, Jr.
(74) *Attorney, Agent, or Firm* — McClure, Qualey & Rodack, LLP (57) ABSTRACT

The invention relates to a basket (1) for cooking food for a cooking utensil designed to cook the food in an atmosphere charged with steam, said basket (1) having a bottom (6) that is permeable to steam and an upper annular side wall (8) extending upwards from said bottom (6) so as to co-operate therewith to form a receptacle for receiving said food, said basket being characterized in that it further has a lower annular side wall (9) extending downwards from said bottom (6), said lower annular side wall (9) being shaped to channel the steam towards said bottom (6) so that the steam channeled in this way passes at least locally through said bottom (6).

17 Claims, 4 Drawing Sheets

(56) References Cited

U.S. PATENT DOCUMENTS

| | | | | |
|---|---|---|---|---|
| 4,739,698 | A * | 4/1988 | Allaire | 99/410 |
| 5,189,947 | A * | 3/1993 | Yim | 99/415 |
| 5,216,947 | A * | 6/1993 | Cheng | 99/417 |
| 5,402,712 | A * | 4/1995 | King et al. | 99/407 |
| 5,584,235 | A | 12/1996 | DuBois et al. | |
| 6,779,438 | B1 * | 8/2004 | Citrynell et al. | 99/347 |
| 6,840,159 | B1 * | 1/2005 | Li | 99/337 |
| 2007/0181008 | A1 * | 8/2007 | Pawlick et al. | 99/450 |

* cited by examiner

FOOD COOKING BASKET AND CORRESPONDING COOKING SYSTEM

CROSS REFERENCE RELATED APPLICATIONS

This application is a national phase of PCT/FR2009/052527 filed Dec. 14, 2009, which claims priority to French application Ser. No. 08/59,044 filed Dec. 23, 2008, which is entirely incorporated herein by reference.

TECHNICAL FIELD

The present invention relates to the general technical field of cooking food in an atmosphere charged with steam, e.g. by means of a steam cooker or of a pressure cooker, and the present invention relates more particularly to food-cooking baskets that are designed to be put in place in such utensils for the purpose of cooking food.

The present invention thus relates to a basket for cooking food for a cooking utensil designed to cook the food in an atmosphere charged with steam, said basket having a bottom that is permeable to steam and an upper annular side wall extending upwards from said bottom so as to co-operate therewith to form a receptacle for receiving said food.

The present invention also relates to a cooking system comprising firstly a cooking utensil designed to cook food in an atmosphere charged with steam, and secondly a food-cooking basket having a bottom that is permeable to steam and an upper annular side wall extending upwards from said bottom so as to co-operate therewith to form a receptacle for receiving said food.

STATE OF THE PRIOR ART

In order to enable the user of a pressure cooker to cook food otherwise than by merely immersing the food into the liquid contained in the cooking vessel, it is necessary to make provision for a cooking basket for containing the food to be incorporated into the vessel, and to provide cooking basket support means in or from the walls at a certain predetermined height so as to a enable the basket to be supported at a predetermined height above the cooking liquid.

It is also necessary to provide a certain number of perforations in the basket so as to enable steam to circulate not only inside the enclosure of the pressure cooker, but also through the food, in such a manner as to optimize heat exchange.

Such systems are very well known and use generally metal baskets having a variety of shapes and capacities, the basket support means being constituted by a removable support, made, for example, of steel wire, and placed on the bottom of the vessel when the user wishes to perform steam cooking. There also exist support means formed by separate parts (rivets) mounted on the wall of the vessel, or formed by localized deformations in the wall of the vessel, such deformations supporting the basket at a predetermined height above the bottom of the vessel.

Currently known metal baskets can be categorized into two main types.

The first type of basket is constituted by "net" baskets, such a basket being obtained using interlaced or meshed steel wires and being provided with a stiffener structure imparting a certain amount of strength to it. Such baskets are generally satisfactory, but they suffer from drawbacks associated with it being difficult for them to retain food because of the their large mesh-sizes, and with it being very difficult for them to be cleaned, precisely because of the meshing that, in particular, prevents food waste from being removed properly. In addition, the lifetimes of such baskets are short because they are relatively fragile.

The second type of known basket is constituted by metal baskets, such a basket being obtained by die-stamping and being provided with a series of perforations formed either in the bottom of the basket, or in the bottom and also through the side walls.

Such baskets are generally satisfactory and are acceptably easy to clean. Unfortunately, their capacity to procure good heat exchange with the food is very variable and is difficult to control.

It is also known that a balanced diet requires a regular intake of vitamins, in particular of vitamin C, from fruit and vegetables, which constitute the main sources of vitamins. Research conducted on this subject has shown not only that the level of consumption of fruit and vegetables in the population has been insufficient in recent years, but also that the general trend indicates that that consumption is falling, in relative terms. Among the factors that might explain that low level of consumption and that general trend, it has been noted, in the potential consumer, that there exist a series of usage constraints that tend to limit consumption of fruit and vegetables, namely: the necessity for fruit and vegetables to be procured frequently, the necessity for the procured fruit and vegetables to be cleaned or indeed peeled, and finally the necessity for the vegetables to be cooked, it being understood that the cooking constraint, which is perceived negatively, is a constraint in terms of the cooking time required.

There therefore exists a general need to improve the general dietary conditions, or at least to prevent them from deteriorating. That need has led to solutions being sought for reducing the time required for cooking food, and in particular for cooking vegetables. In addition, it is also known that vitamins are very sensitive to cooking conditions, and can be totally or partially destroyed, and can be leached out, or indeed degraded during cooking. Of all vitamins, vitamin C is the most fragile, and yet fruit and vegetables provide about 85% of dietary intake of vitamin C.

It is therefore extremely important for vitamin C content in vegetables to be maintained once they have been cooked, in particular by pressure cooking.

Among the known phenomena making the vitamin C contained in vegetables fragile when subjected to cooking, it can be mentioned that vitamin C is soluble in water when it is in the form of folates, thereby making it sensitive to being leached out by the cooking water. In addition, vitamin C is sensitive to heat and is destroyed in a manner proportional to the time/temperature pair applied during cooking. Finally, vitamin C is sensitive to oxidation, and the more it is contact with air, the more it is degraded. There therefore exists a general problem of vitamin preservation, and in particular of preservation of vitamin C, when vegetables are cooked in a steam atmosphere, and in particular in pressure-cooking utensils such as pressure cookers.

In order to address this general problem, the Applicant has proposed a fully perforated basket that is described in the French patent application published under number FR-2 832 613. That basket has enabled significant progress to be made in terms of cooking time reduction and of vitamin preservation. That basket has subsequently itself been improved, by most of the perforations in its bottom being omitted, so that said bottom is substantially uninterrupted, only a narrow peripheral band of said bottom and the side wall of the basket remaining perforated. That improved basket makes it possible to obtain results that are remarkable in terms of cooking time reduction and of vitamin preservation.

However, it can still be optimized with a view to obtaining a further reduction in cooking time and a further improvement in vitamin preservation.

Furthermore, it is necessary to form localized deformations in the wall of the vessel of the pressure cooker in order to support that prior art basket at a predetermined height from the bottom of the vessel, in order to prevent the food from being immersed in the liquid present in the vessel. Although such localized deformations are particularly simple to form, forming them constitutes an additional industrial constraint and affects the general appearance of the vessel.

OBJECT OF THE INVENTION

Objects assigned to the invention are thus to remedy the various above-mentioned drawbacks, and to propose a novel basket for cooking food in a steam atmosphere that makes it possible to reduce the time required for cooking the food while also preserving the vitamins present in the food, in particular vegetables, and that is particularly simple to install in any cooking utensil.

Another object of the invention is to propose a novel food-cooking basket that is of particularly simple and inexpensive construction.

Another object of the invention is to propose a novel food-cooking basket that makes it possible to facilitate the flow of steam through the food and to enable the temperature to rise more rapidly.

Another object of the invention is to propose a novel food-cooking basket that makes it possible to optimize the circulation of steam inside the cooking vessel.

Another object of the invention is to propose a novel food-cooking basket that makes it possible to reduce the quantity of energy necessary for the cooking.

Another object of the invention is to propose a novel food-cooking basket that is particularly robust and easy to manufacture, while also being easy to clean.

Another object of the invention is also to propose a novel cooking system that makes it possible to reduce the time required for cooking the food while also preserving the vitamins present in the food.

Another object of the invention is to propose a novel cooking system of particularly simple and inexpensive design.

The objects assigned to the invention are achieved by means of a basket for cooking food for a cooking utensil designed to cook the food in an atmosphere charged with steam, said basket having a bottom that is permeable to steam and an upper annular side wall extending upwards from said bottom so as to co-operate therewith to form a receptacle for receiving said food, said basket being characterized in that it further has a lower annular side wall extending downwards from said bottom, said lower annular side wall being shaped to channel the steam towards said bottom so that the steam channeled in this way passes at least locally through said bottom.

The objects assigned to the invention are also achieved by means of a cooking system comprising firstly a cooking utensil designed to cook food in an atmosphere charged with steam, and secondly a food-cooking basket having a bottom that is permeable to steam and an upper annular side wall extending upwards from said bottom so as to co-operate therewith to form a receptacle for receiving said food, said cooking system being characterized in that said basket further has a lower annular side wall extending downwards from said bottom, said lower annular side wall being shaped to channel the steam towards said bottom so that the steam channeled in this way passes at least locally through said bottom.

BRIEF DESCRIPTION OF THE DRAWINGS

Other objects and advantages become explained in more detail on reading the following description and on examining the accompanying drawings, which are given by way of non-limiting illustrative example, and in which.

BEST MANNER OF IMPLEMENTING THE INVENTION

The invention relates to a basket 1 for cooking food 2 for use in a cooking utensil 3 that is designed to cook said food 2 in an atmosphere charged with steam or "steam atmosphere".

The basket 1 of the invention is designed to be used and disposed in any type of utensil for cooking food in a steam atmosphere, e.g. in a steam cooker operating substantially at atmospheric pressure, or preferably in a utensil for cooking food under pressure, such as a pressure cooker. The invention thus also relates to a cooking system per se, comprising firstly a cooking utensil 3 that is designed to cook food 2 in an atmosphere charged with steam, and secondly a basket 1 of the invention for cooking food 2.

Figure 2:
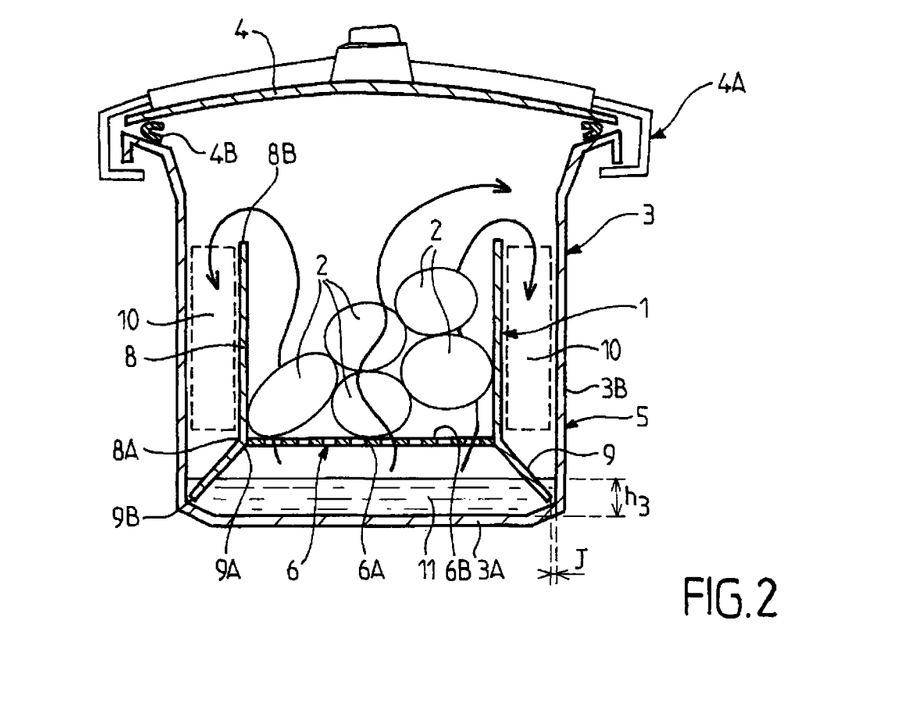
FIG. 2 is a diagrammatic section view of a cooking system of the invention comprising a pressure cooker inside which a basket as in the FIG. 1 variant is installed.

Preferably, the food-cooking basket 1 is specifically designed to be used and disposed in a pressure cooker, so that it then constitutes a pressure cooker basket 1. In this preferred situation, the cooking system of the invention thus comprises firstly a pressure cooker (forming the cooking utensil 3) and secondly a basket 1 of the invention for cooking food 2, said basket advantageously being distinct and independent from the vessel 5 of the pressure cooker, and being designed to be inserted into the vessel 5 so as to stand, preferably directly, on the bottom of said vessel. Results that are particularly remarkable as regards speed of cooking and preservation of vitamins can be obtained by means of the basket 1 when it is used in conjunction with a utensil for cooking food under pressure, such as a pressure cooker, regardless of the type of said pressure cooker (clamping bar, jaw, bayonet, or manhole, this list of types not being exhaustive). The basket 1 of the invention is particularly advantageous when it is used in a pressure cooker operating at cooking pressures significantly greater than atmospheric pressure, e.g. exceeding atmospheric pressure by at least 20 kilopascals (kPa), and preferably by at least 40 kPa. Such a pressure cooker is conventionally provided with locking means 4A for locking its lid 4 to its vessel 5, which means are constituted, for example, by a system of jaws as shown in FIG. 2, and such a pressure cooker is preferably provided with a pressure regulation system, constituted, for example, by a regulator valve (not shown).

In the invention, the basket 1 has a bottom 6 which is advantageously constituted by a sheet of a rigid material, and is, for example, substantially disk-shaped. Advantageously, the bottom 6 is made of a rigid material that is capable of durably and continuously withstanding use in a utensil for cooking in a steam atmosphere, and in particular in a pressure cooker, requiring it to be in contact with food, of withstanding successive and repeated cleaning operations, and of withstanding the stages during which the pressure cooker is brought up to temperature and up to pressure. Preferably, the bottom 6 is made of stainless steel, it nevertheless being understood that other materials, in particular plastics materials, can be used without going beyond the general ambit of the invention. The bottom 6 can have a substantially flat overall shape, i.e. it can extend advantageously in a plane, but it can also have a curved, convex, or concave shape, or any other shape deemed appropriate in view of the use to be made of it.

In the invention, the bottom 6 is permeable to steam. In other words, the bottom 6 is specially designed to pass steam through its thickness. This means that the bottom 6A does not constitute a barrier impermeable to steam but rather it allows steam to pass through it. The bottom 6 having such permeability to steam can be achieved by any means known to the person skilled in the art, and, for example, by using a sufficiently porous material for forming the bottom 6, or, preferably, by perforating the material of which said bottom is made, perforation being the preferred solution because it makes it possible to obtain a flow-rate of steam through the bottom 6 that is as high as possible. Thus, in the preferred embodiments shown in the figures, the bottom 6 is provided with perforations 7 that are preferably distributed substantially uniformly over the area of said bottom 6, i.e. they are distributed in uniform and balanced manner over the entire area of said bottom 6.

Figure 7:
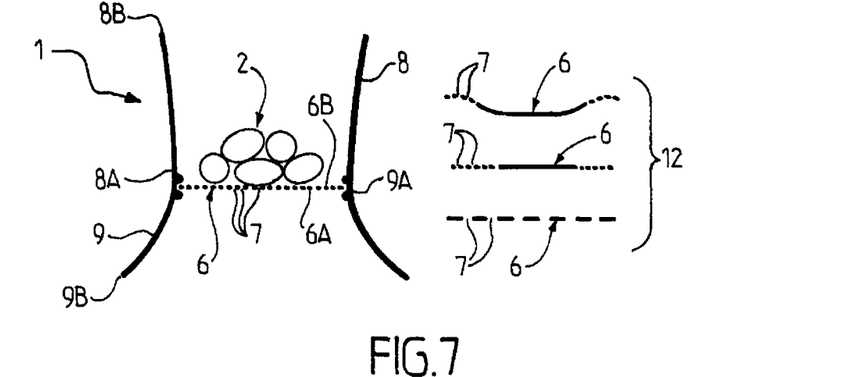
FIG. 7 is a diagrammatic section view of a fourth embodiment of a cooking basket of the invention.

However, it is quite possible, as shown, for example, in FIG. 7, for the perforations 7 to be distributed in only localized manner over the bottom 6, and, for example, only around a peripheral band, the center of the bottom being uninterrupted and substantially impermeable to steam. In the meaning of the invention, the characteristic of the bottom 6 being permeable to steam is thus an overall characteristic of said bottom 6, i.e. it is quite possible, as explained above, for certain portions of the bottom 6 to be totally impermeable to steam, the essential requirement being that the steam can pass through the bottom 6 at least locally from the bottom face 6A to the top face 6B of said bottom.

In the preferred embodiments shown in the figures, the bottom 6 is constituted by a disk-shaped rigid metal sheet provided with a plurality of perforations 7 extending through its entire thickness. However, it is quite possible for the bottom 6 to be flexible, and, for example, for it to be constituted by a net formed using wires or threads made of a metal or plastics material. In which case, the perforations 6 correspond to the empty spaces (or voids in the mesh) left between the wires or threads constituting the net in question. In other variant embodiments, the bottom 6 may be constituted by a screen, a trellis, or a grid, the essential requirement being for the bottom 6 to be provided with openings, or in any event for it to have permeability sufficient to allow steam to pass through its thickness from its bottom face 6A to its top face 6B.

Advantageously, the perforations 7 provided through the bottom 6 represent at least 30% and preferably at least 40% of the total area of said bottom 6. The performance of the basket 1 of the invention in terms of cooking speed and of vitamin preservation increases with increasing degree of permeability of the bottom 6, and thus with increasing percentage of perforations 7 therein.

When the bottom 6 is constituted by a perforated metal sheet, a perforation percentage of approximately in the range 30% to 40% is ideal, the value of 40% making it possible, in particular, to obtain excellent results. When the bottom 6 is constituted by a grid or by a net that is formed, for example, from metal wires, the perforations represent a percentage that can be significantly greater than 40% of the total area of the bottom 6, thereby making it possible to obtain excellent results in terms of cooking time reduction and of vitamin preservation. However, using a flexible net suffers from a certain number of drawbacks as regards ease of cleaning of the basket 1 and as regards its mechanical stability during the cooking process, in particular when the basket holds a large amount of food. In this respect, it is particularly advantageous for the bottom 6 to be rigid and flat, as shown in the figures.

In the invention, the basket 1 for cooking food 2 also has an upper annular side wall 8 extending upwards from the bottom 6 so as to co-operate therewith to form a receptacle for receiving said food 2, as shown, in particular, in FIGS. 2 and 7. Advantageously, and as shown in the figures, the upper annular side wall 8 thus extends upwards from and at the periphery of the bottom 6 between a bottom edge 8A connected to the bottom 6 and a free top edge 8B.

In the examples shown in the figures, the bottom 6 has a substantially circular shape and the upper annular side wall 8 itself therefore has a shape that is circularly symmetrical about an axis X-X' passing through the center of the bottom 6 and corresponding substantially to the vertical direction when the basket 1 is in its in-use position.

The free top edge 8B of the upper annular side wall 8 thus forms an opening making it possible to insert food into the basket 1, within a receptacle defined firstly by the bottom 6 and more precisely by the top face 6B of said bottom 6, and secondly by the upper annular side wall 8. The food thus rests on the bottom 6, which is therefore designed to form a support surface for said food, even when said food is in "loose" form (potatoes, peas, green beans, etc.).

In the invention, the basket 1 also has a lower annular side wall 9 that extends downwards from the bottom 6, i.e. in the direction opposite to the direction in which the upper annular side wall 8 extends from the bottom 6. In other words, the upper annular side wall 8 extends on the same side as the top face 6B of the bottom 6, whereas the lower annular side wall 9 extends downwards from the bottom 6 on the same side as the bottom face 6A of said bottom 6. Advantageously, as shown in the figures, the lower annular side wall 9 extends from and at the periphery of the bottom 6 between a top edge 9A connected to the bottom 6 and a free bottom edge 9B. Preferably, the lower annular side wall 9 follows on from the upper annular side wall 8. For example, in the embodiment shown in FIGS. 1 and 2, the top edge 9A of the lower annular side wall 9 and the bottom edge 8A of the upper annular side wall 8 substantially coincide or in any event are immediately adjacent. Advantageously, like the upper annular side wall 8, the lower annular side wall 9 is circularly symmetrical about the axis X-X'. Thus, in the variants shown in the figures, along the vertical axis X-X', the basket 1 has a height H that corresponds to the sum of the height $h_1$ of the lower annular side wall 9 and of the height $h_2$ of the upper annular side wall 8.

In this situation, the bottom 6 is thus disposed remotely from the extreme edges of the basket 1, which edges are respectively constituted by the free top edge 8B of the upper annular wall 8 and by the free bottom edge 9B of the lower annular wall 9.

In accordance with the invention, the lower annular side wall 9 is shaped to channel the steam towards the bottom 6. In other words, the lower annular side wall 9 is designed to direct the steam towards the bottom 6, and more precisely towards the bottom face 6A of said bottom 6, so that, during the cooking cycle, the steam passes through said bottom 6 and propagates amongst and possibly through the food 2 that is disposed on said bottom 6. The lower annular side wall 9 thus acts as a funnel making it possible to concentrate the steam on the core of the heap of food 2, thereby making it possible to flush out the air present between the food, such removal of the air that is naturally trapped in the heap of food making it possible to accelerate the cooking while preserving the vitamins from oxidation. In other words, the lower annular side wall 9 guides the steam towards the bottom 6 so as to force the steam to pass through the bottom 6 and through the heap of food 2 supported by the bottom 6, thereby making it possible to flush out the air present within the heap of food 2. Thus, the lower annular side wall 9 is designed to channel the steam substantially over its entire height $h_1$ towards the bottom 6, while avoiding significant lateral loss of the steam over the path of height $h_1$. Thus, the lower annular side wall 9 channels the steam towards a zone of the bottom that is permeable to steam (and is, for example, perforated or porous), so that the steam channeled in this way pass through said bottom 6 at least locally. The lower annular side wall 9 thus defines an internal volume that receives and channels the steam generated during cooking. Preferably, the height $h_1$ represents at least 10% of the height $h_2$, in order to optimize the steam-channeling effect procured by the lower annular side wall 9. In addition, and optionally in complementary manner, the height $h_1$ is no less than 1 cm, and preferably greater than or equal to 2 cm, so that the contents of the basket (the food to be cooked) are raised sufficiently relative to the cooking liquid, the lower side wall 9 thus, in this situation, also acting as a height booster making it possible to maintain the food at least in part substantially out of contact with the cooking water contained in the vessel of the pressure cooker. In which case, the height $h_1$ advantageously represents at least 4% of the diameter D1 of the free bottom edge 9B, and even more preferably at least 8% of said diameter D1.

In order to channel the steam, the lower annular side wall 9 is advantageously substantially impermeable to steam. For example, the lower annular side wall 9 is advantageously substantially uninterrupted, i.e. it has no porosity or perforation that might give rise to any significant lateral loss of steam through the lower annular side wall 9.

For example, the bottom annular side wall 9 is made of a rigid material such as a metal material of the stainless steel type, it being understood that it is quite possible to use any other material, and, for example, a plastics material.

Figure 6:
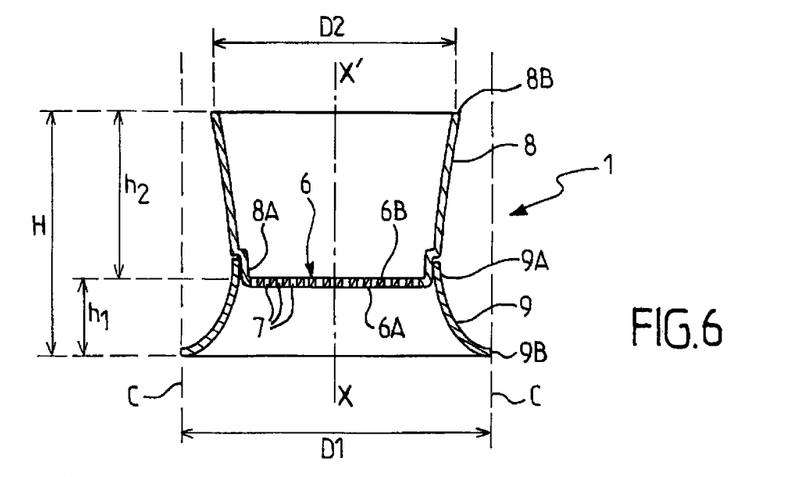
FIG. 6 is a diagrammatic section view of a third embodiment of a cooking basket of the invention.

Advantageously, the upper annular wall 8 lies within a cylindrical volume C whose generator line is the free bottom edge 9B of the lower annular side wall 9 (cf. FIG. 6). In other words, in the embodiments shown in the figures, the diameter D1 of the lower annular side wall 9 at its free bottom edge 9B is greater than the largest diameter D2 of the upper annular side wall 8, so that said upper annular side wall preferably lies substantially entirely within the cylindrical volume C.

Preferably, and as shown in the figures, the perimeter of the free bottom edge 9B of the lower annular side wall 9 is thus substantially greater than or equal to the perimeter of the top edge 9A of said lower annular side wall 9. In other words, the lower side wall 9 has a profile that flares going downwards from the bottom 6.

Figure 1:
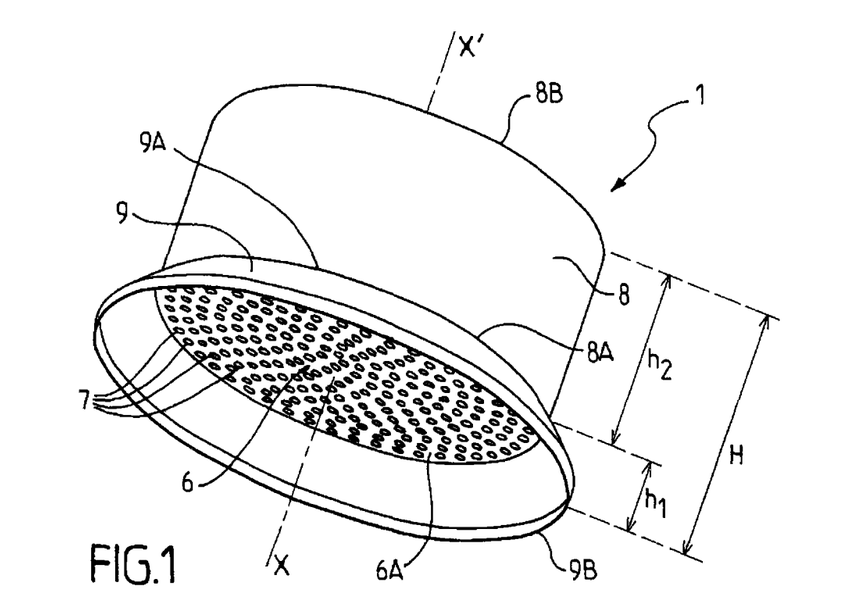
FIG. 1 is a perspective view of a first variant embodiment of a cooking basket of the invention.
Figure 5:
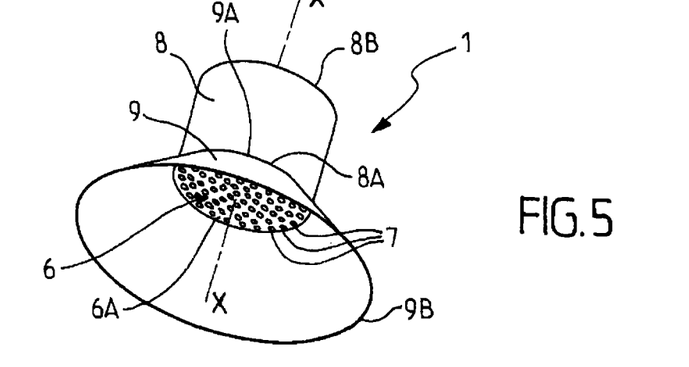
FIG. 5 is a perspective view of a second embodiment of a cooking basket of the invention.

Advantageously, and as shown in FIGS. 1, 2, and 5 to 7, the lower annular side wall 9 flares, preferably progressively, downwards from its top edge 9A to its free bottom edge 9B. In this situation, the lower annular side wall 9 is horn-shaped. For example, the lower annular side wall can have a substantially frustoconical shape, as shown in FIGS. 1 and 5, that is optionally extended, at its free edge 9B, by a straight cylindrical rim as shown in FIG. 1. However, it is quite possible for the lower annular side wall 9 to have a curved profile, as in FIGS. 6 and 7, without going beyond the ambit of the invention.

Advantageously, the upper annular side wall 8 is substantially cylindrical, as shown in FIGS. 1, 2, and 5, or indeed slightly flared going upwards from the bottom 6, as shown in FIGS. 6 and 7, without the diameter of its free top edge 8B exceeding the diameter of the free bottom edge 9B of the lower annular side wall 9. Such a geometrical shape makes it possible to direct and to concentrate the steam towards the bottom 6 so as to force said steam to pass though the bottom 6 and to flush out the air trapped in the food 2 being cooked, the air flushed out from the food in this way coming to be concentrated in an annular side zone 10 shown by dashed lines in FIG. 2. In order to keep said air away from the food, which is important in view of the thermally insulating nature of air, the upper annular side wall 8 is itself substantially impermeable to gas, i.e. it is preferably not porous and not provided with any perforations that could establish communication between the inside of the basket and the outside thereof through the thickness of the upper annular side wall 8. Naturally, absolute and perfect impermeability is not necessarily required for the upper annular side wall 8, the essential requirement being for said upper annular side wall to act sufficiently as a barrier to the air stored in the side annular zone 10 situated outside the basket in register with the upper annular side wall 8 and with the lower annular side wall 9, as shown in FIG. 2. The same naturally applies to the lower annular side wall 9 whose degree of permeability to steam should merely be sufficiently low to prevent significant lateral loss of steam, which would prevent the flow of steam from being concentrated towards and through the bottom 6. The impermeable nature of the upper annular side wall 8 and/or of the lower annular side wall 9 further makes it possible prevent the steam present inside the basket from coming to push the air contained in the side annular zone 10 out therefrom, which would unfavorably disturb the cooking process.

Advantageously, the basket 1 is designed to be stood on a support that is preferably constituted by the bottom wall 3A of a cooking utensil 3. For this purpose, the lower annular side wall 9 is shaped to act as a stand or base for the basket 1.

The shaping of the lower annular side wall 9 thus enables the basket 1 to stand stably on a substantially flat support, and in particular on a bottom wall 3A of a cooking utensil 3, as shown in FIG. 2. Thus, the lower annular side wall 9 advantageously performs two functions, namely firstly a function of channeling steam towards the bottom 6 and secondly a function of providing a base enabling the basket 1 to stand stably on a support surface. It is therefore no longer necessary, with the basket 1 of the invention, to provide any special system in or on the cooking utensil 3 for the purpose of holding the basket 1 in position. The lower annular side wall 9 also makes it possible to maintain the bottom 6 some distance away from the bottom wall 3A of the cooking utensil, thereby making it possible to prevent the food 2 from being immersed in any cooking liquid 11 present in the cooking utensil 3, so long as the user makes sure that the level of cooking liquid 11 does not exceed the height $h_1$ of the lower annular side wall 9. Advantageously, the free bottom edge 9B of the lower annular side wall 9 lies substantially and preferably entirely within a plane so as to impart to the basket 1 a plane annular bearing surface that not only enables it to stand stably but also makes it possible to create a closed zone defined by the bottom wall 3A of the cooking utensil 3, by the lower annular side wall 9, and by the bottom 6, the steam generated in this closed space being able to escape only via the bottom 6, which is permeable to steam.

In a particularly advantageous variant that is shown in FIG. 2, the food-cooking basket 1 is a basket for a cooking utensil 3 that has a bottom wall 3A against which the basket 1 is designed to rest, the shape and the perimeter of the free bottom edge 9B of the lower annular side wall 9 substantially matching the shape and the perimeter of the periphery of said bottom wall 3A of the utensil 3, as shown in FIG. 2.

Such shaping of the basket 1 to match the cooking utensil 3 with which it is designed to be used makes it possible not only for the basket 1 to be self-centered inside the cooking utensil 3, but also and above all for substantially all of the steam that is generated by the cooking liquid 11 covering the bottom wall 3A to be collected, the steam in question thus being concentrated towards the bottom 6 so as to pass therethrough and so as to expel the air trapped amongst the food 2.

In the variants shown in FIGS. 1, 2, and 5, the basket 1 constitutes a one-piece unit, i.e. the upper annular side wall 8, the bottom 6, and the lower annular side wall 9 are fastened together permanently, e.g. by welding or by any other mechanical assembly method. For this purpose, it is, for example, possible for the upper annular side wall 8 and for the bottom 6 to be formed in one piece, and for the lower annular side wall 9 to be separate and engaged by force, optionally with a steam-tight sealing gasket being interposed, onto the sub-assembly formed by the upper annular side wall 8 and by the wall 6, as shown in FIG. 6. It is quite possible for such assembly to be performed by the end user, once the basket has been purchased. This configuration in two one-piece portions is also advantageous in terms of storage and transport. If, as shown in FIG. 6, the upper annular side wall 8 is significantly flared going upwards, then it is possible to stack up stably and compactly a plurality of one-piece sub-assemblies each of which is constituted by the upper annular side wall 8 and by the bottom 6. In the same way, it is possible, due to their flared nature, to stack up one-piece parts each forming the lower annular side wall 9.

This makes it possible to save space for storage and transport up to final assembly that can, as mentioned above, be performed by the consumer.

In another embodiment shown in FIG. 7, the upper annular side wall 8 and the lower annular side wall 9 form a one-piece part, this part being, for example, in the form of a double-flared tube having a shape that is not unlike a circularly symmetrical hyperboloid of one sheet. An independent grid forming the bottom 6 is then mounted, optionally by the end user, inside the double-flared tube forming the upper annular side wall 8 and the lower annular side wall 9. The bottom 6 is held in position by means of a locking groove or by any other means (e.g. a flexible gasket) disposed on the inside face of the above-mentioned tube, at the interface between the upper annular side wall 8 and the lower annular side wall 9, as shown in FIG. 7. In this embodiment, it is quite possible for the bottom 6 to be removable, i.e. for it to be put in place and removed at will by the user who optionally has a set 12 of a plurality of different bottoms 6, differing, for example, by the distributions and/or the sizes of the perforations 7, and by whether or not the bottom 6 is curved. This particular design also makes it possible to separate the operation of manufacturing the bottom 6 from the operation of manufacturing the other elements making up the basket 1. Such separate manufacturing thus offers considerable freedom in the choice of the shapes and materials of the bottom 6A which, for example, can be compartmented to receive food of different types without them mixing, or indeed, can be provided with supports designed, for example, to co-operate with removable receptacles (e.g. ramekins or the like) designed to be attached temporarily to the bottom 6 for the time it takes for the cooking. Such a separate-bottom design constitutes an invention per se, independently of the other inventive aspects described herein.

In all situations, it is advantageous to provide the basket 1 with a fold-away carrying handle (not shown) fastened, for example, in the vicinity of the free top edge 8B of the upper annular side wall 8.

The invention also relates independently to a cooking system, shown in FIG. 2, comprising firstly a cooking utensil 3 designed to cook food in an atmosphere charged with steam, said utensil 3 preferably being a pressure cooker, and secondly a food-cooking basket 1 of the invention.

The basket 1 of the above-mentioned system is thus as described above.

Preferably, the cooking utensil 3 comprises a vessel 5 designed to be closed by a lid 4, said vessel 5 thus comprising a bottom wall 3A that is preferably disk-shaped and from the periphery of which a side wall 3B extends that is provided with a free edge defining an opening making it possible to access the inside of the vessel 5, which vessel preferably has a circularly symmetrical shape whose axis coincides with the axis X-X' when the basket 1 is in the in-use position. The basket 1 is preferably designed to be inserted into said vessel 5 via the opening in question with a view to said basket standing, via the inside of the vessel 5, on the bottom wall 3A, as shown in FIG. 2. Advantageously, and as already mentioned above, the shape and perimeter of the free bottom edge 9B of the lower annular side wall 9 substantially match the shape and perimeter of the periphery of said bottom wall 3A (cf. FIG. 2). This means that the clearance J existing between the lower annular side wall 9 and the side wall 3B of the vessel is advantageously minimized to a value enabling the basket 1 to slide in self-centered manner inside the vessel 5 which has a section substantially complementary to the free edge 9B of the lower annular side wall 9. The flared nature of the lower side wall 9 also makes it possible to define the zones 10 for storing the flushed-out air between the side wall 3B of the vessel 5 and the outside faces of the upper annular side wall 8 and of the lower annular side wall 9 of the basket 1. The air trapped in the heap of food 2 can thus be flushed out into a neutral zone 10, i.e. into a zone situated outside the main cooking zone, thereby preventing any disturbance to cooking.

An example of operation of a cooking system of the invention is given below. Firstly, the user puts a volume of water 11 into the vessel 5 of the cooking utensil 3 which, in this example, is constituted by a pressure cooker. Said volume of water is chosen so that the height $h_3$ of water above the bottom wall 3A does not exceed the height $h_1$ of the lower annular side wall 9 of the basket 1. The user then puts the food 2 into the basket 1, on the top face 6B of the bottom 6. The basket 1 thus filled with food 2 is then put into the vessel 5 until the free bottom edge 9B of the lower annular side wall 9 comes to bear on and against the bottom wall 3A of the vessel 5. Since the shape of the free edge 9B matches the shape of the bottom wall 3A, the lower annular side wall 9 thus substantially entirely overlies said bottom wall 3A, and thus the water 11 disposed on said bottom wall 3A. The lid 4 is then put on and locked onto the vessel 5, e.g. by a system of jaws 4A. The resulting leaktight cooking enclosure (with a gasket 4B being present between the lid 4 and the vessel 5) that contains the basket 1 which itself contains the food 2 is then placed on a heat source (e.g. a hot plate). Under the effect of the heating, the temperature of the water 11 rises and said water comes to the boil, thereby generating steam. Insofar as the diameter D1 of the free bottom edge 9B is only very slightly smaller than the diameter of the bottom wall 3A, ignoring the clearance J, most of the steam generated by the water 11 coming to the boil is collected between the lower annular side wall 9, the bottom wall 3A and the bottom 6. Most or indeed substantially all of the steam generated in this way is thus channeled by the lower annular side wall 9 towards the bottom 6, and passes through said bottom 6 via the orifices 7 that are provided therein. By means of this massive flow of steam, obtained by means of the channeling effect of the lower annular side wall 9, the air that is usually trapped between items of food 2, inside the heap of food 2, is flushed out upwards by the steam and is channeled by the upper annular side wall 8.

Said air then accumulates in the peripheral annular zone 10 defined firstly by the side wall 3B of the vessel 5 and secondly by the outside faces of the lower and upper annular side walls 9 and 8 of the basket 1. Thus, the zone in which the food 2 to be cooked is positioned is free of any thermal insulation effect due to the air, thereby enabling the maximum cooking temperature to be reached very quickly at the core of the heap of food 2. By means of this faster cooking, obtained by flushing out the air particularly effectively and quickly at the beginning of the cooking process, a large quantity of vitamins is preserved, and the heat source can be switched off earlier than with prior art utensils. Naturally, the air flushed out from the heap of food 2 could be removed at the beginning of cooking via a discharge system (discharge valve), or indeed via the regulator valve of the pressure cooker. In any event, if not all of the air flushed out from the food 2 by the steam has been removed via the discharge or via the regulator valve, said air accumulates in the zone 10 as explained above.

The advantages of the basket 1 of the invention and of the corresponding cooking system of the invention can be quantified in two mutually related manners:
  saving in cooking time, because the maximum cooking temperature is reached faster in the core of the heap of food 2 for the reasons explained above; and
  gain in vitamin preservation, because the sensitive vitamins (e.g. vitamin C) are less subjected to the phenomenon of oxidation (since the air is flushed out as explained above) and to the destructive effect of cooking temperature (the cooking time is shorter because the maximum cooking temperature is reached more quickly at the core of the heap of food 2).

The Applicant has conducted cooking tests on broccoli and on green beans, these being foods that are cooked in heaps and that are thus likely to trap air during cooking. The tests conducted consisted in performing a cooking cycle in the same pressure cooker whose operating pressure was set at 54 kPa, firstly using a basket 1 of the invention, in a variant corresponding to FIG. 1, and secondly using a reference prior art basket. The pressure cooker used for the tests was also equipped with a discharge system facilitating removal of steam from the enclosure of the pressure cooker while it is being brought up to pressure. The prior art basket forming the reference basket had a design identical to the design of the basket described in Document FR-2 832 613, except that most of the perforations in its bottom were omitted, so that said bottom was substantially uninterrupted, only a narrow peripheral band of said bottom remaining perforated, as did the side wall of the basket. In a first series of tests, 400 grams (g) of green beans were cooked with the basket 1 of the invention and with the reference basket described above, in the same pressure cooker with an operating pressure set at 54 kPa. Whereas the cooking time with the reference basket was about 6 minutes (min) and 30 seconds (s), the cooking time with the basket 1 of the invention was reduced to 5 min and 15 s, i.e. procuring a saving of about 20%. Similar tests were conducted with 400 g of broccoli, making it possible to observe a saving of about 17% in terms of cooking time, the basket 1 of the invention making it possible to cook the broccoli in 2 min and 30 s as against 3 min in the reference basket. In addition, whereas 55% of the vitamin C in the green beans cooked in the reference basket was preserved, that percentage was 62% for the green beans cooked in the basket 1 of the invention, i.e. a gain in excess of 6% was procured.

Figure 3:
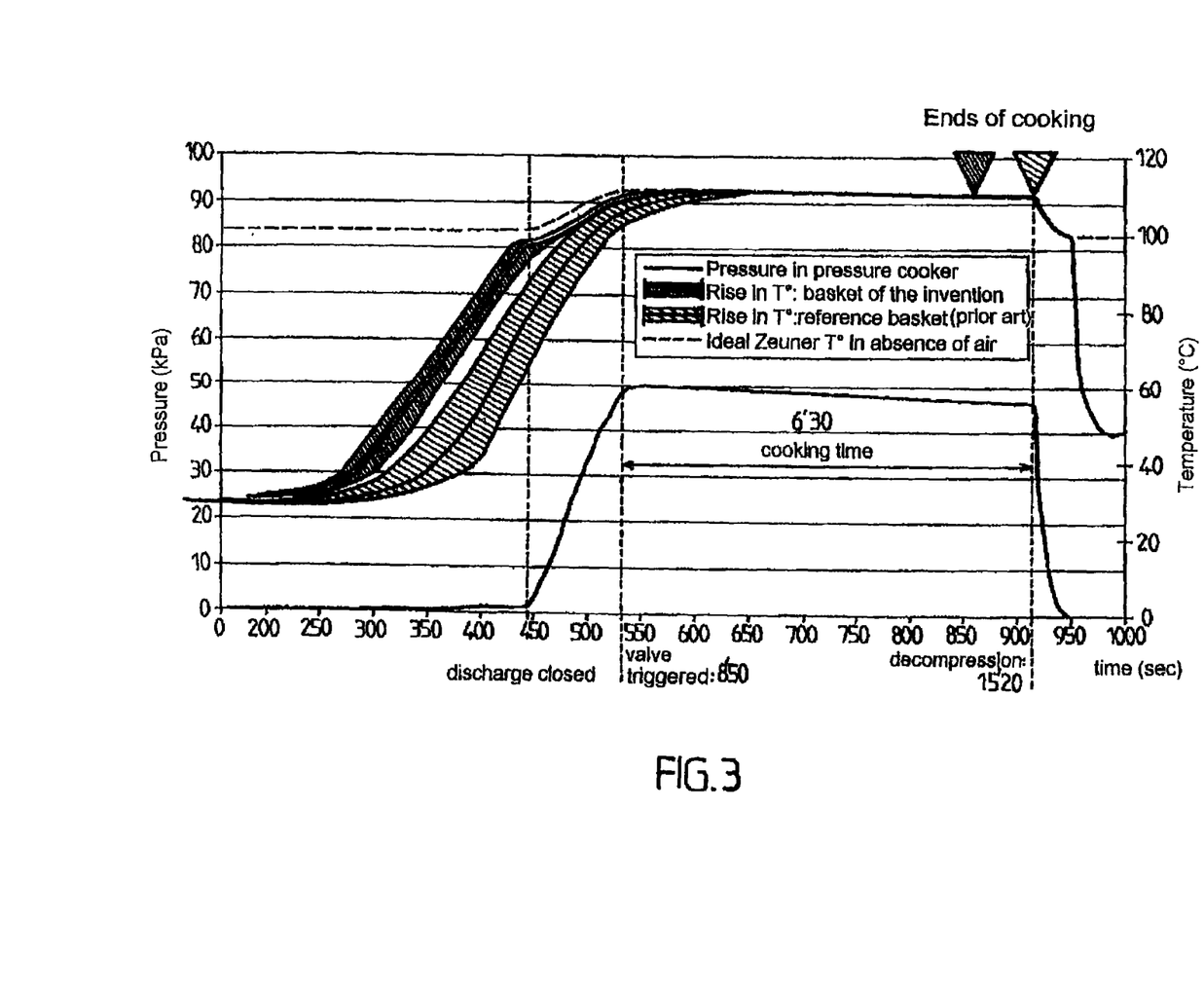
FIG. 3 is a graph showing, in particular, how the temperatures at the core of a heap of green beans placed in a basket of the invention and in a prior art basket vary over time.
Figure 4:
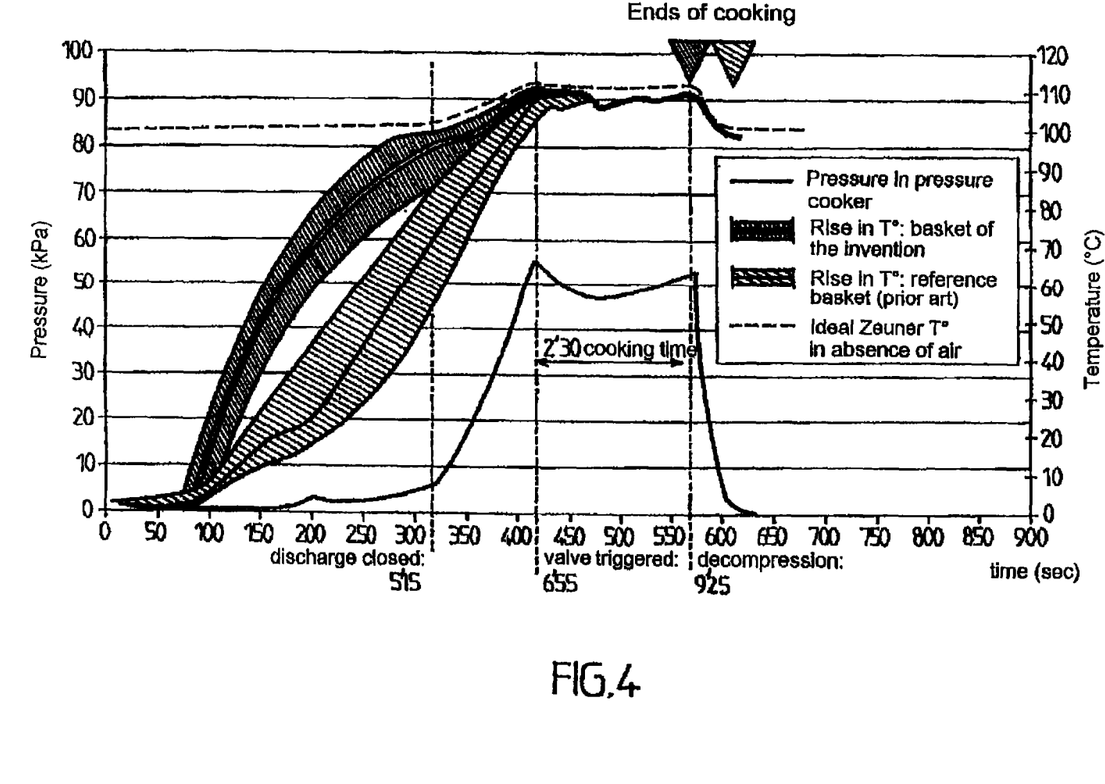
FIG. 4 is a graph showing, on a basis comparable to the graph of FIG. 3, how the temperatures at the core of a heap of broccoli placed in a basket of the invention and in a prior art basket vary over time.

Pressure and temperature readings, as given in the graphs of FIGS. 3 and 4 were also taken during the tests in order to confirm that the cooking temperature was reached more rapidly in the novel basket 1 of the invention. Thus, the graphs of FIGS. 3 and 4 contain the following information, respectively for cooking 400 g of green beans and for cooking 400 g of broccoli in a pressure cooker whose operating pressure was set at 54 kPa:
  variation of the temperature inside the cooking enclosure as a function of time when the food is placed in the reference basket; this core temperature was measured at various points of the heap of food (green beans or broccoli as applicable) so that the variation in core temperature is shown by a zone, which is hatched in this example;
  variation of the temperature inside the cooking enclosure as a function of time when the food is placed in the basket 1 of the invention; this core temperature was measured at various points of the heap of food (green beans or broccoli as applicable) so that the variation in core temperature is shown by a zone, which is hatched in this example more densely than in the reference basket zone;
  variation in the Zeuner temperature (in dashed lines), i.e. in the ideal boiling temperature of the water 11 as a function of pressure, in the absence of air;
  end of cooking in the basket 1 of the invention and in the reference basket, this end of cooking being determined by conventional tenderness tests; and
  variation in the pressure (in uninterrupted lines) prevailing in the cooking enclosure as a function of time.

The graphs of FIGS. 3 and 4 thus show that the solid zone of all of the temperatures read at the core of the heap of green beans or of broccoli is earlier than the hatched zone of temperatures obtained with the reference basket, the solid zone of temperature obtained with the basket 1 of the invention also being closer to the Zeuner temperature curve. This earlier temperature rise obtained with the basket 1 of the invention makes it possible to reach the end of cooking more quickly and to preserve the vitamins. These results thus attest to the effectiveness of the cooking basket 1 of the invention in terms of reduction in cooking time and thus in terms of vitamin preservation. Naturally, the quantitative results depend on the food in question. For food whose vitamins are particularly exposed, results that are even more pronounced could be observed.

Finally, the Applicant has observed that the effectiveness of the basket 1 of the invention can be further accentuated by increasing the volume of the neutral zone 10. However, that reduces the capacity of the basket. Nevertheless, for a small quantity of food, a basket 1 as in the variant of FIG. 5, i.e. having an upper annular side wall 8 whose section is significantly smaller than the section defined by the free bottom edge 9B of the lower annular side wall 9 makes it possible to obtain excellent results in terms of speed of cooking and of preservation of vitamins.

Naturally, the specific shapes corresponding to the examples shown in the figures are not the only possible shapes, the only essential requirement to be complied with being that most and preferably almost all of the steam should be guided through the food, and a zone 10 in which the remaining air can be collected without being in contact with the food being cooked should advantageously be left.

It is also possible, in a variant that is not shown, for the basket 1 to form a table accessory by being associated with a dish designed to be fastened to the free bottom edge 9B of the lower annular side wall 9, said dish thus being designed to receive the juices draining from the food contained in the basket 1. The basket 1 can then be brought to the table without any risk of wetting said table.

The basket 1 of the invention enables most food that is generally steamed, in a pressure cooker or in some other steam-cooking utensil, to be cooked more rapidly. It enables the vitamins to be less subjected to oxidation, larger quantities of which vitamins remain present in the food than with any other known basket at an equivalent level of cooking. The heat source can thus be switched off earlier, thereby enabling less energy to be consumed for performing the cooking.

SUSCEPTIBILITY OF INDUSTRIAL APPLICATION

The invention finds industrial application in the design, fabrication and use of cooking utensils, especially of utensils for cooking food under pressure of the pressure cookers type.

The invention claimed is:

1. A basket (1) for cooking food (2) in a cooking utensil (3) designed to cook the food (2) in an atmosphere charged with steam, said basket (1) comprising a perimeter that varies between a minimum value and a maximum value, a bottom (6) that is permeable to steam and an upper annular side wall (8), said upper annular side wall (8) having a perimeter comprising said minimum value and circular symmetrical shape about an axis passing through a center of the bottom (6) and extending upwards from said bottom (6) so as to co-operate therewith to form a receptacle for receiving said food (2), said basket being characterized in that the basket further has a lower annular side wall (9) connected to said upper wall (8) and extending downwards from said bottom (6), said lower annular side wall (9) being shaped to channel the steam towards said bottom (6) so that the steam channeled in this way passes at least locally through said bottom (6), the lower annular side wall (9) having a top edge (9a) and extending between said top edge (9A) connected to said bottom (6) and a free bottom edge (9B) defining an opening, the perimeter of said free bottom edge (98) comprising said maximum value and being greater than the perimeter of said top edge (9A) and greater than said perimeter of the upper annular side wall (8).

2. A basket (1) according to claim 1, in which said upper annular side wall (8) lies within a cylindrical volume (C), said cylindrical volume (C) having a generator line, said generator line being said free bottom edge (98) of the lower annular side wall (9).

3. A basket (1) according to claim 1 in which said free bottom edge (98) lies within a plane.

4. A basket (1) according to claim 1 comprising firstly a cooking utensil, in which said cooking utensil (3) has a bottom wall with a shape and a perimeter against which the basket (1) is designed to rest, said free bottom wall has a shape and a perimeter, the shape and the perimeter of said free bottom edge (98) matching the shape and the perimeter of the periphery of said bottom wall.

5. A basket (1) according to claim 1 in which said lower annular side wall (9) is uninterrupted.

6. A basket (1) according to claim 1 in which said upper annular wall (8) is uninterrupted.

7. A basket (1) according to claim 1 in which said bottom (6) is provided with perforations (7).

8. A basket (1) according to claim 1 in which said basket (1) constitutes a basket (1) for a pressure cooker.

9. A cooking system comprising firstly a cooking utensil (3) designed to cook food (2) in an atmosphere charged with steam, said cooking utensil (3) comprising a vessel (5) with a bottom wall (3A) and secondly a food-cooking basket (1) having a bottom (6) that is permeable to steam and an upper annular side wall (8) having a perimeter and extending upwards from said bottom (6) so as to co-operate therewith to form a receptacle for receiving said food (2), said cooking system being characterized in that said basket (1) further has a lower annular side wall (9) extending downwards from said bottom (6) and having a free bottom edge (9B), said lower annular side wall (9) being shaped to channel the steam towards said bottom (6) so that the steam channeled in this way passes at least locally through said bottom (6), said basket (1) being put into the vessel (5) so that the free bottom edge (9B) of the lower annular side wall (9) bears on and against the bottom wall (3A) of the vessel (5) and in which the perimeter of said free bottom edge (9B is greater than the perimeter of the upper annular side wall (8) and has an open bottom for channeling steam upwardly to said basket (1).

10. A cooking system according to claim 9, in which said lower annular side wall (9) has a top edge (9A) connected to said bottom (6) and said free bottom edge (9B) has a shape and a perimeter, said lower annular side wall (9) extending between said top edge (9A) and said free bottom edge (9B), said cooking utensil (3) having a bottom wall (3A) with a shape and a perimeter against which the basket (1) is designed to rest, the shape and the perimeter of said free bottom edge (98) matching the shape and the perimeter of the periphery of said bottom wall (3A).

11. A system according to claim 9 in which said cooking utensil (3) is designed to form a cooking enclosure designed to contain said basket (1).

12. A system according to claim 9 in which said cooking utensil (3) is a pressure cooker.

13. A basket (1) according to claim 9 in which a free top edge (8B) of said upper annular side wall (8) lies substantially within a plane.

14. A basket (1) according to claim 9 in which said upper annular side wall (8) has a cylindrical shape.

15. A basket (1) for cooking food (2) in a cooking utensil (3) designed to cook the food (2) in an atmosphere charged with steam, said basket (1) comprising a bottom (6) that is permeable to steam and an upper annular side wall (8) extending upwards from said bottom (6) so as to co-operate therewith to form a receptacle for receiving said food (2), said basket being characterized in that the basket further has a lower annular side wall (9) connected to said sidewall (8) and extending downwards from said bottom (6), said lower annular side wall (9) being shaped to channel the steam towards said bottom (6) so that the steam channeled in this way passes at least locally through said bottom (6), said upper annular side wall (8) having a height which is everywhere greater than a height of the lower annular side wall (9), said lower annular side wall (9) further including a top edge (9A) and a bottom edge (9B) defining an opening and in which said bottom edge flares outwardly from said top edge, and in which said bottom edge (9B) has a perimeter greater than said receptacle.

16. A basket (1) according to claim 15 in which said upper annular side wall (8) has a cylindrical shape.

17. A food cooking method comprising:
providing a cooking utensil (3) designed to cook food (2) in an atmosphere charged with steam, said cooking utensil (3) comprising a vessel (5) with a bottom wall (3A);
providing a food-cooking basket (1) having a bottom (6) that is permeable to steam and an upper annular side wall (8) extending upwards from said bottom (6) so as to co-operate therewith to form a receptacle for receiving said food (2), said basket (1) further having a lower annular side wall (9) extending downwards from said bottom (6) and having a free bottom edge (9B), said lower annular side wall being shaped to channel the steam towards said bottom (6) so that the steam channeled in this way passes at least locally through said bottom (6),
putting said basket (1) into the vessel (5) so that the free bottom edge (9B) of the lower annular side wall (9) bears on and against the bottom wall (3A) of the vessel (5), said free bottom edge (9B) having a perimeter greater than said receptacle and defining an opening for collecting and channeling steam toward said basket (1).

* * * * *